United States Patent
Mavromatis

(10) Patent No.: US 9,276,981 B2
(45) Date of Patent: *Mar. 1, 2016

(54) OPTIMIZED COMMUNICATION OF MEDIA CONTENT TO CLIENT DEVICES

(71) Applicant: Disney Enterprises, Inc., Burbank, CA (US)

(72) Inventor: Dionysius Mavromatis, Kirkland, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/328,579

(22) Filed: Jul. 10, 2014

(65) Prior Publication Data

US 2014/0325031 A1    Oct. 30, 2014

Related U.S. Application Data

(63) Continuation of application No. 12/931,557, filed on Feb. 3, 2011, now Pat. No. 8,849,990.

(51) Int. Cl.
| | |
|---|---|
| G06F 15/16 | (2006.01) |
| H04L 29/06 | (2006.01) |
| H04L 12/24 | (2006.01) |
| H04L 12/927 | (2013.01) |
| H04L 12/911 | (2013.01) |

(52) U.S. Cl.
CPC .......... *H04L 65/60* (2013.01); *H04L 41/0896* (2013.01); *H04L 47/781* (2013.01); *H04L 47/808* (2013.01)

(58) Field of Classification Search
CPC ..... H04L 67/16; H04L 65/1083; H04L 65/80; H04L 67/14; G06F 15/16
USPC ........................... 709/204, 217, 224; 455/569
See application file for complete search history.

(56) References Cited

U.S. PATENT DOCUMENTS

| | | | |
|---|---|---|---|
| 6,390,922 B1 * | 5/2002 | Vange et al. ..................... 463/42 |
| 6,711,137 B1 * | 3/2004 | Klassen et al. ................ 370/252 |
| 6,885,641 B1 * | 4/2005 | Chan et al. ..................... 370/252 |
| 7,681,219 B2 * | 3/2010 | Conradt ............. H04N 7/17318 725/109 |
| 7,761,900 B2 * | 7/2010 | Crayford ............ H04N 7/17318 709/223 |
| 7,783,773 B2 * | 8/2010 | Wu ...................... H04L 65/4069 709/203 |
| 7,933,632 B2 * | 4/2011 | Flynt ...................... G06F 3/0481 340/995.1 |
| 8,190,400 B1 * | 5/2012 | Astolfi et al. ..................... 703/1 |
| 8,220,018 B2 * | 7/2012 | de Andrade ........ H04N 5/44543 725/32 |
| 8,249,925 B2 * | 8/2012 | Broms .................. G06Q 30/02 705/14.1 |
| 8,597,028 B2 * | 12/2013 | Paul ........................ G08B 7/02 434/236 |
| 8,625,607 B2 * | 1/2014 | Rieger ................... H04H 20/42 370/395.64 |
| 8,745,133 B2 * | 6/2014 | Martinez ........... G06F 17/30067 709/204 |
| 8,812,377 B2 * | 8/2014 | Ljunggren ............. G06Q 30/04 705/26.1 |
| 2004/0133907 A1 * | 7/2004 | Rodriguez ............. H04H 20/10 725/14 |
| 2009/0124241 A1 * | 5/2009 | Krishnaswamy et al. . 455/414.2 |
| 2009/0125321 A1 * | 5/2009 | Charlebois et al. ............... 705/1 |
| 2010/0192213 A1 * | 7/2010 | Ta et al. ............................. 726/7 |
| 2011/0205240 A1 * | 8/2011 | Marks et al. .................. 345/589 |
| 2012/0089700 A1 * | 4/2012 | Safruti ................ H04L 67/2842 709/217 |

* cited by examiner

Primary Examiner — Tesfay Yohannes

(74) Attorney, Agent, or Firm — Farjami & Farjami LLP

(57) ABSTRACT

There is provided a system and method for determining an optimal bandwidth for a communication between a networked client device and a server. There is provided a method comprising identifying the networked client device, identifying a location of the networked client device, obtaining a client device profile for the networked client device corresponding to the location, and determining the optimal bandwidth using the client device profile. In this manner, client devices may almost instantly stream the highest quality video available.

18 Claims, 4 Drawing Sheets

OPTIMIZED COMMUNICATION OF MEDIA CONTENT TO CLIENT DEVICES

This application is a Continuation of U.S. application Ser. No. 12/931,557, filed Feb. 3, 2011, which is hereby incorporated by reference in its entirety.

BACKGROUND OF THE INVENTION

1. Field of the Invention

The present invention relates generally to streaming video content to a networked client device. More particularly, the present invention relates to determining an optimum bandwidth for a networked client device.

2. Background Art

When a networked client device streams video content from a server, the server must send adequate packets to the networked client to ensure a smooth viewing experience without any stutters. Based on the client device's available bandwidth, the server can calculate an adequate bit rate to stream video without interruptions. Presently, there are several methods for a server to calculate a proper bit rate.

One approach requires a user to select a bit rate, based upon user knowledge of the client device available bandwidth. The major drawback to this approach, however, is that the user must be sophisticated enough to choose the best bit rate in order to stream video without interruptions. To overcome this drawback, many implementations give the user a limited set of bit rate choices, such as a broadband option and a dial-up option. Because of the limited choices, the user may not be able to choose the most efficient bit rate available for that user's client device. In addition, the available bandwidth may fluctuate depending on network conditions. The user may not be aware of such fluctuations or other changes to the available bandwidth. For example, the user may be using a smartphone and move from an area with faster 4G coverage to an area with only 3G coverage. Moreover, the network itself may suffer from outages or congestion, which may significantly impact the available bandwidth. This may result in the user, for example, unknowingly selecting a bit rate which exceeds the available bandwidth. The network may also improve, for example from hardware upgrades or reduced congestion. The user may select a bit rate which does not fully utilize the available bandwidth. Moreover, this approach typically results in the user being prompted to select a bit rate again at the start of a different stream.

In another approach, the client device first downloads sample data before beginning the stream, typically in a hand shake session. Based on the time required for the client device to download the sample data, the server will determine a bit rate. Because the bit rate is based upon actual network conditions at the time, the bit rate may be more accurate than a bit rate based upon a user selection. Although this approach may address the problems associated with user-selected bit rate determination, the initial downloading of the sample data may introduce delays before the actual stream begins. The client device must first download the sample data before the server knows at what bit rate to stream. In addition, the bandwidth available to the client device may change from that indicated by the initial sample data download. In other words, the sample data may have been downloaded at a time when the available bandwidth was particularly higher, or lower than average. For instance, the sample data may have been downloaded at night, when network traffic may be less congested than usual.

In yet another approach, the server may use an adaptive bit rate. As the stream is being delivered, the bit rate is adjusted according to changes in the available bandwidth of the client device. The adaptive bit rate is capable of accounting for bandwidth fluctuations or changes, unlike the previously mentioned approaches. However, the adaptive bit rate requires a starting point. Consequently, the adaptive bit rate solution tends to err on delivering the lowest or highest available quality of stream. When the quality of stream is too high, the server typically sends packets that do not reach the client device in time. The client device must then buffer or cache parts of the stream in order to accumulate enough packets to display an uninterrupted segment of video. However, this buffering results in pauses or delays which interrupt the stream. Conversely, when the quality of stream is too low, the server is not sending as many packets as the client device is capable of receiving. The stream itself does not need to pause for buffering, but the picture quality is unnecessarily degraded. As a result, the user is unable to obtain the highest quality stream available, although the picture quality may improve over time as the bit rate adjusts itself. By constantly adjusting the bit rate, an adaptive bit rate may eventually reach a suitable bit rate. However, the initial stream may suffer from delays or degraded quality and the user does not instantly get the best possible stream. Subsequent streams may require reapplying this process.

To improve streaming performance, these approaches may be combined. For example, an adaptive bit rate may start at a bit rate derived from a user selection. Although the adaptive bit rate may adjust itself for bandwidth fluctuations, the initial determination of a bit rate suffers the same drawbacks of a user-selected bit rate. Additionally, the initial bit rate may be improved by utilizing sample data to calculate a bit rate. However, downloading the sample data causes a delay before the actual stream may begin. Furthermore, a subsequent stream may require repeating the entire process.

Accordingly, there is a need to overcome the drawbacks and deficiencies in the art by providing a solution enabling a substantially immediate determination of the optimum bit rate at which to communicate with a networked client device, so as to initially stream the highest quality video possible without delays.

SUMMARY OF THE INVENTION

There are provided systems and methods for determining an optimal bandwidth for a networked client device, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for determining an optimal bandwidth for communication between a networked client device and a server. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
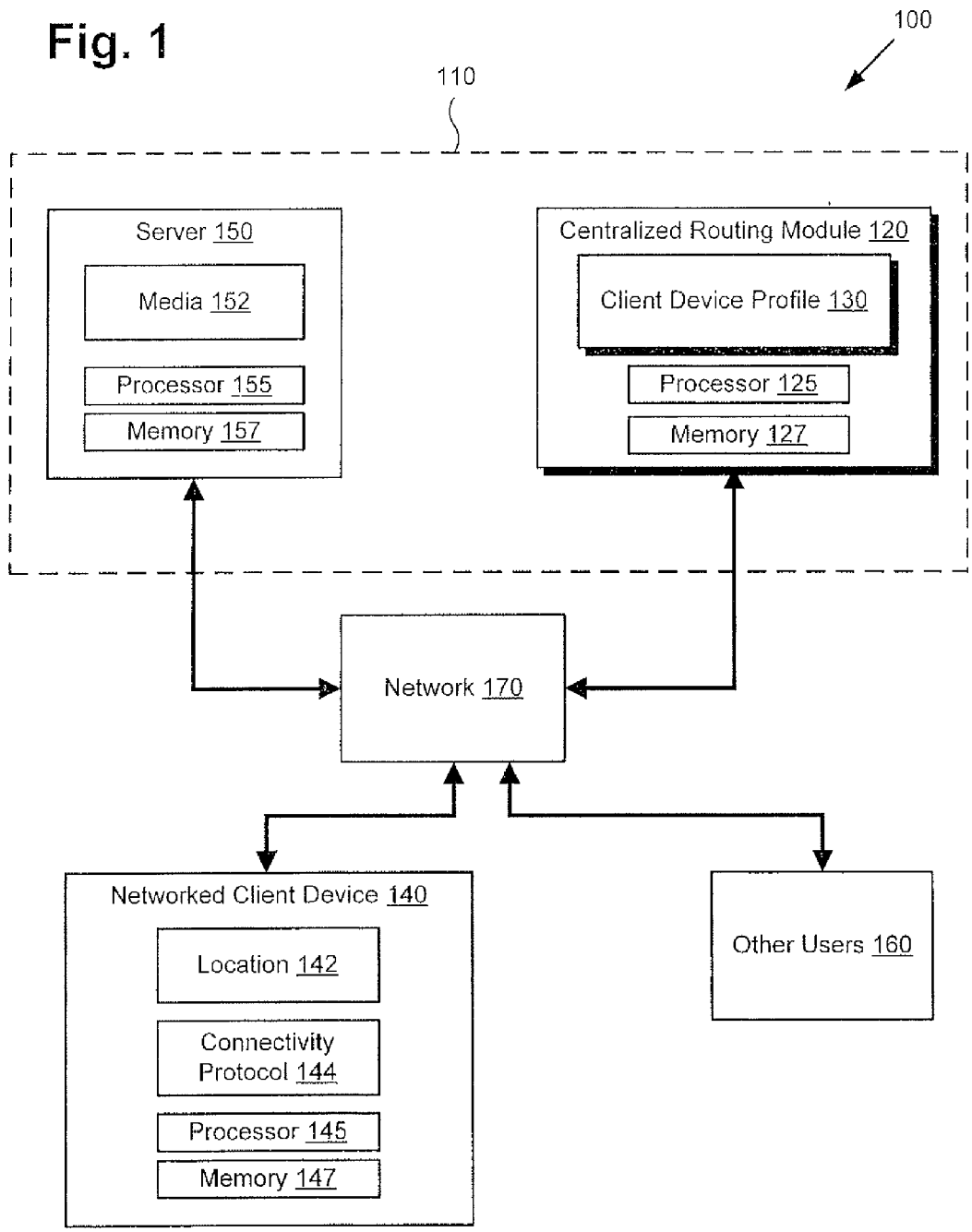
FIG. 1 presents a system for determining an optimal bandwidth for communication between a networked client device and a server, according to one embodiment of the present invention.

FIG. 1 presents a system for determining an optimal bandwidth for communication between a networked client device and a server, according to one embodiment of the present invention. Network environment 100 of FIG. 1 includes centralized routing system 110, network 170, networked client device 140 (also referred to as client device 140), and other users 160. Centralized routing system 110 includes server 150 and centralized routing module 120. Server 150 includes media 152, processor 155, and memory 157. Centralized routing module 120 includes client device profile 130, processor 125, and memory 127. Client device 140 includes processor 145 and memory 147. According to the embodiment shown in FIG. 1, client device 140 can be characterized by location 142 and connectivity protocol 144.

Servers typically apply a combination of a user-selected bit rate, an initial download of sample data to determine a bit rate, and/or an adaptive bit rate, in order to determine an appropriate bit rate for streaming media content. Each approach has drawbacks which are inadequately resolved by any of its conventional alternatives. The adaptive bit rate may cure issues involving bandwidth fluctuations during a stream, but suffers from sub-optimal performance in the initial stages of the stream. The user-selected bit rate or initial download approaches may improve the initial determination of a bit rate, but suffer from inaccuracies and uncertainties or added delays. The present invention is directed to a centralized routing system that improves the initial determination of a bit rate without adding such inaccuracies, uncertainties, or delays.

In one embodiment, centralized routing system 110 may comprise two discrete system components, as shown by server 150 and centralized routing module 120. For example, server 150 may comprise a server and centralized routing module 120 may comprise another server. In an alternative embodiment, centralized routing system 110 may comprise a single integrated system component, such as a server, configured to perform the functions of server 150 and centralized routing module 120. In FIG. 1, server 150 and centralized routing module 120 may communicate to each other through network 170. Although not shown in FIG. 1, in alternative embodiments, server 150 and centralized routing module 120 may communicate to each other directly without the need for network 170.

Server 150 may comprise a host computer, such as a server, capable of network communications. Processor 155 is a computer processor capable of performing the tasks of server 150 described below. Memory 157 may comprise an area of computer memory under control of processor 155, such as RAM or ROM, where software instructions and algorithms may reside. Media 152 may comprise any media, such as a video clip. In one embodiment, media 152 may comprise one or more files stored in server 150. Alternatively, media 152 may comprise a video capture of a live event. In this embodiment, media 152 may reside in server 150 on a temporary basis. Server 150, which may act through processor 155, controls access to media 152. Server 150 may handle requests from network 170 to access media 152. For example, if media 152 comprises a file stored in server 150, then server 150 may restrict access to media 152. In this embodiment, server 150 may determine access restrictions based on its own configurations, or in conjunction with other components, such as centralized routing module 120, or other inputs, such as a user input. In alternative embodiments, media 152 may comprise a file stored on a server other than server 150, wherein server 150 retains control of access to media 152. Server 150 may be capable of streaming media 152 through network 170. In embodiments where media 152 does not reside in server 150, server 150 may be capable of instructing the appropriate media source to stream media 152.

Centralized routing module 120 is configured to determine an optimal bandwidth for client device 140 to receive media 152 through network 170. As previously discussed, centralized routing module 120 may be implemented on server 150 or may comprise one or more discrete system components separate from server 150. Similarly, processor 125 and memory 127 may comprise the same components as processor 155 and memory 157, respectively, or may comprise discrete system components. Processor 125 may comprise a computer processor capable of performing the tasks of centralized routing module 120, described below. Memory 127 may comprise an area of computer memory under control of processor 125, such as RAM or ROM, where software instructions and algorithms may reside. Centralized routing module 120, which may act through processor 125, may store or otherwise have access to client device profile 130. Client device profile 130 includes information corresponding to client device 140, such as location 142 and/or connectivity protocol 144, for example. However, client device profile 130 may store other information corresponding to client device 140. For example, client device profile 130 may include information relating to historical bandwidth data regarding client device 140. In addition, centralized routing module 120 may be configured to analyze and/or update client device profile 130.

Network 170 may comprise a packet network, such as the Internet, capable of supporting communication between network connected devices. Network 170 may comprise a combination of wired and wireless connections, and additionally may comprise various connectivity protocols. Such protocols may include mobile data networks from wireless providers, Wi-Fi, and broadband internet connections.

Client device 140 may comprise any device capable of communicating over network 170. Client device 140 may comprise a stationary device, such as an office computer. Client device 140 may also comprise hand-held or mobile devices, such as a smartphone. Processor 145 is a computer processor capable of performing the tasks of client device 140 described below. Memory 147 may comprise an area of computer memory under control of processor 145, such as RAM or ROM, where software instructions and algorithms may reside. A client user may use client device 140, acting through processor 145, to stream media 152 through network 170. Client device 140 may have connected to server 150 directly to access media 152, or may have been redirected from another server to server 150. Location 142 corresponds to the physical location of client device 140. Client device 140 may know or be capable of determining location 142. For example, client device 140 may comprise a GPS device capable of determining its own location information. Alternatively, client device 140 may only include secondary information which may be used to determine its location. For example, an office computer may "know" only its own IP address, from which a location may be roughly calculated. Location 142 may comprise such secondary information. Location 142 may also comprise information provided by the user, such as a zip code or other geographical locators. Connectivity protocol 144 corresponds to the connectivity protocol used by client device 140 to connect to network 170. For example, a smartphone may use long-term evolution (LTE) to connect to network 170.

Other users 160 may comprise one or more users connected to network 170 with devices similar to client device 140. Other users 160 may comprise any combination of users whose network interaction with centralized routing system 110 corresponds to that of the user of client device 140. For example, such a correspondence may be based on a location which corresponds to location 142, or a connectivity protocol which corresponds to connectivity protocol 144, a similar media request for media 152, and so forth. As a specific example of the foregoing, other users 160 may comprise all the users at or near location 142, and requesting media 152 using connectivity protocol 144 at the same time as client device 140.

Figure 2:
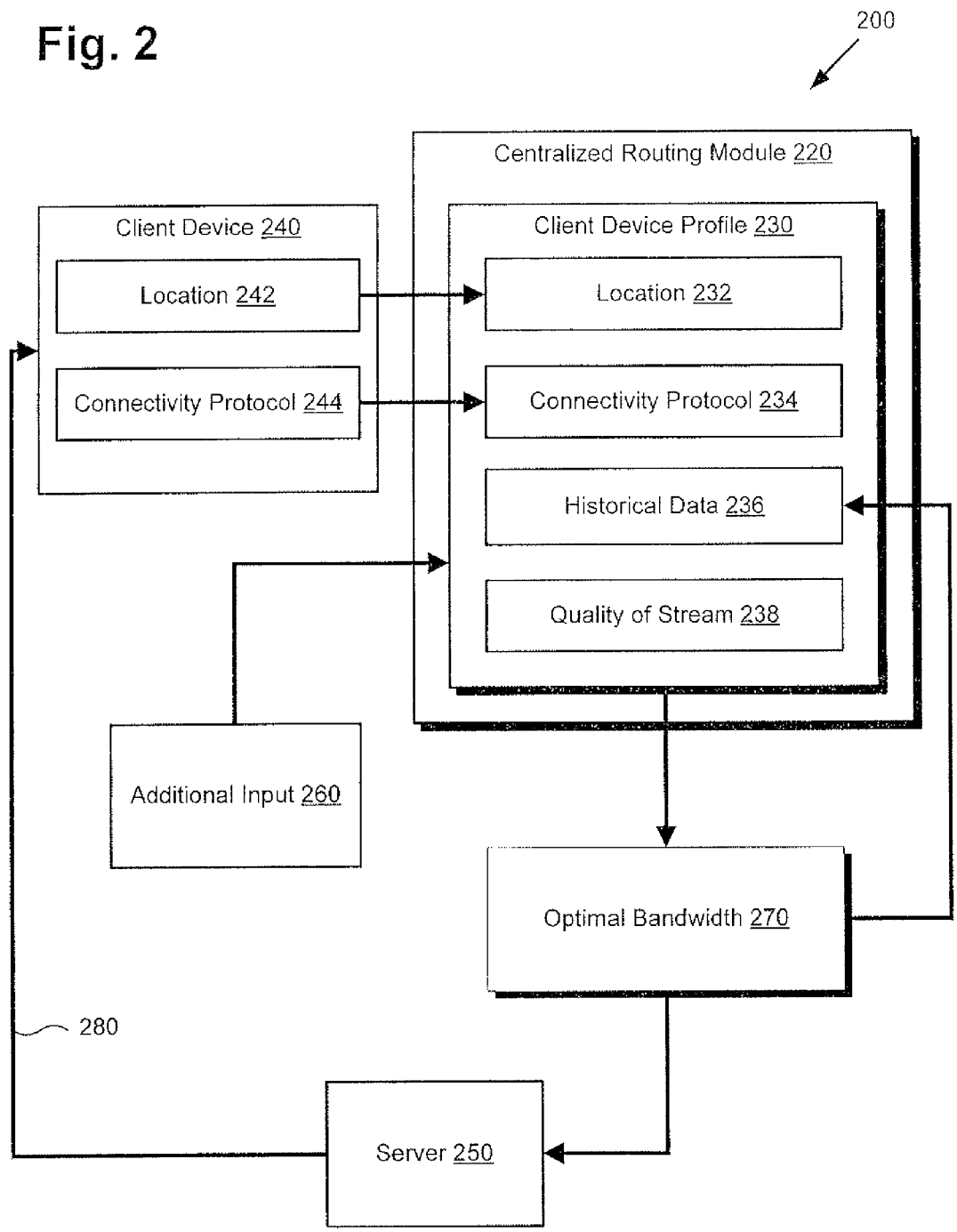
FIG. 2 presents a workflow for determining an optimal bandwidth for a networked client device, according to one embodiment of the present invention.

Moving to FIG. 2, FIG. 2 presents a workflow for determining an optimal bandwidth for a networked client device, according to one embodiment. Network environment 200 of FIG. 2 includes centralized routing module 220, client device 240, server 250, additional input 260, optimal bandwidth 270, and stream 280. Centralized routing module 220, which may correspond to centralized routing module 120 of FIG. 1, includes client device profile 230, which may correspond to client device profile 130 of FIG. 1. Client device profile 230 further includes location 232, connectivity protocol 234, historical data 236, and quality of stream 238. Client device 240, which may correspond to client device 140 of FIG. 1, includes location 242, which may correspond to location 142 of FIG. 1, and connectivity protocol 244, which may correspond to connectivity protocol 144 of FIG. 1. Server 250 may correspond to server 150 of FIG. 1, and additional input 260 may correspond to other users 160 of FIG. 1.

Figure 3:
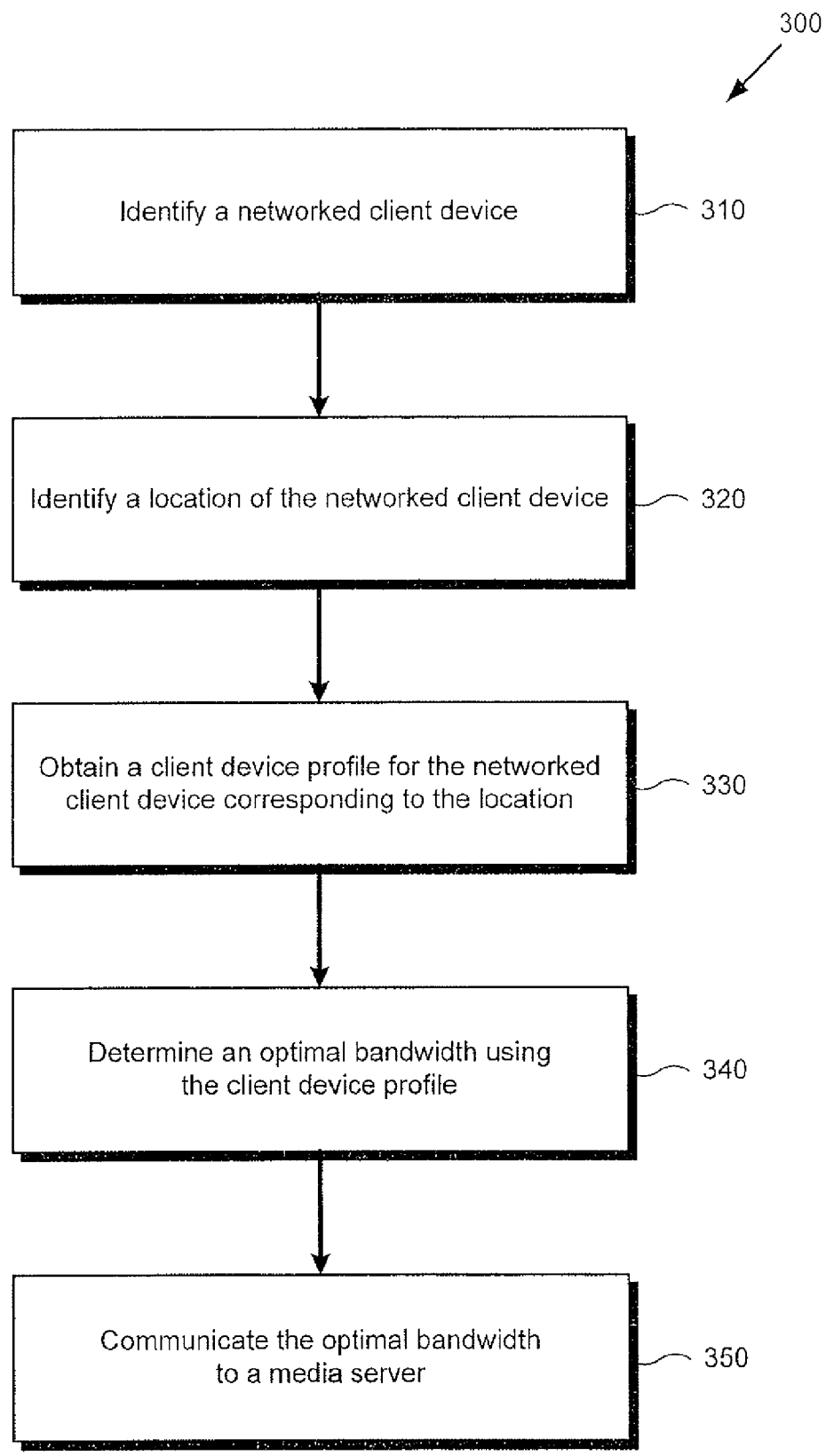
FIG. 3 presents a flowchart describing the steps, according to one embodiment of the present invention, by which an optimal bandwidth for a networked client device may be determined.
Figure 4:
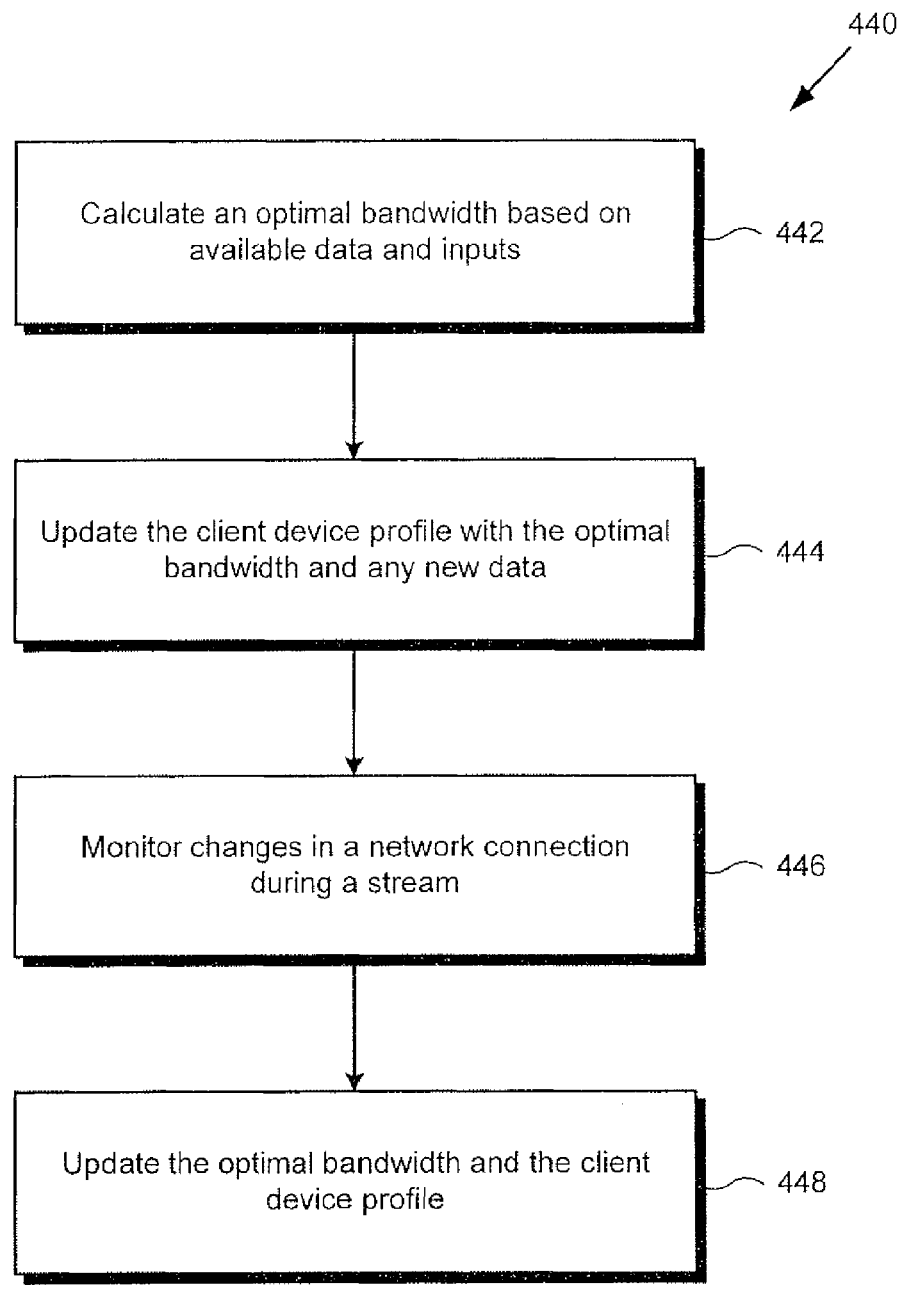
FIG. 4 shows a flowchart describing the steps, according to one embodiment of the present invention, by which a client device profile may be used to determine an optimal bandwidth for a networked client device.

The workflow of FIG. 2 will be further described in conjunction with FIGS. 3 and 4. FIG. 3 shows flowchart 300 of a method for determining an optimal bandwidth for a networked client device, according to one embodiment of the present invention, while flowchart 400 in FIG. 4 shows an example method in which a client device profile may be used to determine an optimal bandwidth for a networked client device. Certain details and features have been left out of flowchart 300 and 400 that are apparent to a person of ordinary skill in the art. For example, a step may comprise one or more substeps or may involve specialized equipment or materials, as known in the art. While steps 310 through 350 indicated in flowchart 300, and steps 442 through 448 indicated in flowchart 400 are sufficient to describe one embodiment of the present invention, other embodiments of the invention may utilize steps different from those shown in flowchart 300 or 400.

Referring now to step 310 of flowchart 300 in FIG. 3, network environment 100 of FIG. 1, and network environment 200 of FIG. 2, step 310 of flowchart 300 comprises identifying a networked client device 140 or 240. When client device 140 attempts to stream media 152, centralized routing system 110 first identifies client device 140, using methods known in the art. Client device 140 may preferably be identified by the type of device it comprises, such as an Apple iPad. Alternatively, client device 140 may be identified by other characteristics, such as operating system or IP address.

Referring to step 320 of flowchart 300 in FIG. 3, and network environment 200 of FIG. 2, step 320 of flowchart 300 comprises identifying location 242 of client device 240. Location 242 may be determined using methods known in the art, including GPS, cell tower triangulation, or user input.

Referring to step 330 of flowchart 300 in FIG. 3, and network environment 200 of FIG. 2, step 330 of flowchart 300 comprises obtaining client device profile 230 for client device 240 corresponding to location 242. Centralized routing module 220 may obtain client device profile 230 which includes location 232, connectivity protocol 234, historical data 236, and quality of stream 238. Location 232 may correspond to location 242. For example, location 232 may be the same as, or in the general vicinity of location 242, which may be represented as a specific location. Alternatively, location 232 may represent a class of locations, such as stadiums, that matches with location 242. Centralized routing module 220 may determine the required level of correspondence. For example, centralized routing module 220 may determine an exact location match to be the required correspondence. Client device profile 230 may also correspond to the identification referred to in step 310. For instance, if client device 240 was identified as an iPad, client device profile 230 may correspond to a client device profile for an iPad.

In alternative embodiments, centralized routing module 220 may obtain a client device profile 230 which corresponds to more than location 242. Connectivity protocol 234 may correspond to connectivity protocol 244 of client device 240. For example, if connectivity protocol 244 corresponded to Wi-Fi, connectivity protocol 234 may also correspond to Wi-Fi. Similarly, client device profile 230 may comprise additional correspondences with client device 240, such as a timestamp. Additional input 260 may also provide additional correspondences, such as a type of media requested. These additional correspondences may help narrow the possible matches for client device profile 230. Although several possible client device profiles may correspond to client device 240, preferably there is one client device profile that corresponds to client device 240 at location 242 using connectivity protocol 244.

Referring to step 340 of flowchart 300 in FIG. 3, and network environment 200 of FIG. 2, step 340 of flowchart 300 comprises determining optimal bandwidth 270 using client device profile 230, which may be further explained with flowchart 400.

Referring now to step 442 of flowchart 400 in FIG. 4, network environment 100 of FIG. 1, and network environment 200 of FIG. 2, step 442 of flowchart 400 comprises calculating optimal bandwidth 270 based on available data and inputs. As seen in FIG. 2, client device profile 230 comprises several elements. Historical data 236 may comprise data which corresponds to historical usage calculations for communication between server 250 and client device 240, located at location 242 using connectivity protocol 244. Historical data 236 may comprise a running average of recorded bandwidths, or may alternatively comprise all communication records between server 250 and client device 240, which may be analyzed by centralized routing module 220. Historical data 236 may allow centralized routing module 220 to determine an expected available bandwidth for the current connection by comparison to similar previous connections. Quality of stream 238 may comprise an intermediate calculation between historical data 236 and optimal bandwidth 270. In one embodiment, quality of stream 238 may comprise a speed category, such as "high," "medium," or "low." In this embodiment, historical data 236 may reveal a relatively high historical bandwidth, corresponding to a "high" value for quality of stream 238. Quality of stream 238 may then be used to derive an appropriate value for optimal bandwidth 270. For example, optimal bandwidth 270 may comprise a value similar to that of quality of stream 238, or may comprise a numerical bit rate value derived from quality of stream 238.

Additional input 260 may also be utilized in deriving optimal bandwidth 270. Additional input 260 may comprise raw data which may affect bandwidth calculations. For instance, the number of other users 160 attempting to access media 152 from location 242 using connectivity protocol 244 on a device similar to client device 240 may affect optimal bandwidth 270. Alternatively, additional input 260 may comprise filters or other limitations. For example, additional input 260 may comprise a filter which filters out a specific date range from historical data 236. In another embodiment, additional input 260 may comprise a cap on quality of stream 238, for example, by restricting the "high" value in response to hardware failures within the network. Additional input 260 may comprise user inputs affecting optimal bandwidth 270.

Referring to step 444 of flowchart 400 in FIG. 4, and network environment 200 of FIG. 2, step 444 of flowchart 400 comprises updating client device profile 230 with optimal bandwidth 270 and any new data. With the newly calculated optimal bandwidth 270, historical data 236 may be updated to reflect optimal bandwidth 270. In embodiments where historical data 236 records connections, optimal bandwidth 270 may be saved as another entry. In alternative embodiments, historical data 236 may comprise updating a running average. Any other new data may be appropriately acknowledged by updating part or all of client device profile 230.

Referring to step 446 of flowchart 400 in FIG. 4, network environment 100 of FIG. 1, and network environment 200 of FIG. 2, step 446 of flowchart 400 comprises monitoring changes in network 170 during stream 280. Stream 280 may start once server 250 is aware of optimal bandwidth 270, which is further described in step 350 of flowchart 300 below. Changes to location 232, connectivity protocol 234, or additional input 260, for example, may require redetermination of optimal bandwidth 270.

Referring to step 448 of flowchart 400 in FIG. 4, network environment 100 of FIG. 1, and network environment 200 of FIG. 2, step 448 of flowchart 400 comprises updating optimal bandwidth 270 and client device profile 230. If the changes monitored in step 446 require redetermination of optimal bandwidth 270, steps 310 to 350 of flowchart 300 may be repeated as necessary. A change in location 242 may necessitate obtaining a different client device profile 230 to correspond to the new location 242. Other changes may require recalculation of quality of stream 238. For example, additional input 260 may reveal an actual bandwidth to be lower than historically expected. Historical data 236 and quality of stream 238 may be updated to reflect the new data, and subsequently optimal bandwidth 270 may be derived again. Consequently, steps 444 through 448 may be repeated as necessary throughout stream 280.

Referring back to flowchart 300 in FIG. 3, network environment 100 of FIG. 1, and network environment 200 of FIG. 2, step 350 of flowchart 300 comprises communicating optimal bandwidth 270 to server 250. Centralized routing module 220 may send optimal bandwidth 270 as data for server 250 to convert into an appropriate bit rate for streaming media 152. Alternatively, centralized routing module 220 may first convert optimal bandwidth 270 into an appropriate bit rate, using methods known in the art, before communicating the bit rate to server 250. Once server 250 receives optimal bandwidth 270, server 250 may begin stream 280 to client device 270, using a bit rate derived from optimal bandwidth 270. Since the bit rate may be derived from historical data, the bit rate may be an accurate estimation of an optimal bit rate. In addition, the determination of the bit rate did not require client device 240 to download any additional data, which would add unwanted delay to stream 280.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A system for facilitating a communication of a media content by a server to a client device, the system comprising:
a centralized routing module accessible by the server, the centralized routing module having a memory and a processor configured to:
identify a type of the client device;
identify a location of the client device;
identify a type of the media content requested by the client device;
obtain a device profile from the memory for the client device, the device profile corresponding to the type of the client device, the location of the client device and the type of the media content requested by the client device;
obtain a historical bandwidth data of the client device from the memory for the client device;
apply data filters to the historical bandwidth data of the client device to generate filtered historical bandwidth data;
determine an optimal bandwidth using the device profile and the filtered historical bandwidth data;
communicate the optimal bandwidth to the server for selecting an optimum bit rate for streaming of the media content to the client device; and update the device profile using the optimal bandwidth.

2. The system of claim 1, wherein the device profile comprises the historical bandwidth data of the client device.

3. The system of claim 1, wherein the device profile comprises a historical bandwidth data of the location.

4. The system of claim 1, wherein the device profile comprises a connectivity protocol for the client device.

5. The system of claim 1, wherein the device profile comprises a quality of stream for the client device.

6. The system of claim 1, wherein the device profile comprises a time data.

7. The system of claim 1, wherein the centralized routing module is further configured to adjust the optimal bandwidth while the video is being streamed to the client device.

8. The system of claim 1, wherein the type of the client device indicates that the client device is an iPad.

9. The system of claim 1, wherein obtaining the device profile from the memory includes selecting the device profile from a plurality of device profiles, wherein each of plurality of device profiles corresponds to the type of the client device, the location of the client device and the type of the media content requested by the client device.

10. A method for use by a centralized routing module accessible by a server to facilitate a communication of a media content by the server to a client device, the centralized routing module having a memory and a processor, the method comprising:
   identifying, using the processor, a type of the client device;
   identifying, using the processor, a location of the client device;
   identifying, using the processor, a type of the media content requested by the client device;
   obtaining, using the processor, a device profile from the memory for the client device, the device profile corresponding to the type of the client device, the location of the client device and the type of the media content requested by the client device;
   obtaining, using the processor, a historical bandwidth data of the client device from the memory for the client device;
   applying, using the processor, data filters to the historical bandwidth data of the client device to generate filtered historical bandwidth data;
   determining, using the processor, an optimal bandwidth using the device profile and the filtered historical bandwidth data;
   communicating, using the processor, the optimal bandwidth to the server for selecting an optimum bit rate for streaming of the media content to the client device; and
   updating the device profile using the optimal bandwidth.

11. The method of claim 10, wherein the device profile comprises the historical bandwidth data of the client device.

12. The method of claim 10, wherein the device profile comprises a historical bandwidth data of the location.

13. The method of claim 10, wherein the device profile comprises a connectivity protocol for the client device.

14. The method of claim 10, wherein the device profile comprises a quality of stream for the client device.

15. The method of claim 10, wherein the device profile comprises a time data.

16. The method of claim 10 further comprising:
   adjusting, using the processor, the optimal bandwidth while the video is being streamed to the client device.

17. The method of claim 10, wherein the type of the client device indicates that the client device is an iPad.

18. The method of claim 10, wherein the obtaining of the device profile from the memory includes selecting, using the processor, the device profile from a plurality of device profiles, wherein each of plurality of device profiles corresponds to the type of the client device, the location of the client device and the type of the media content requested by the client device.

* * * * *